UNITED STATES PATENT OFFICE.

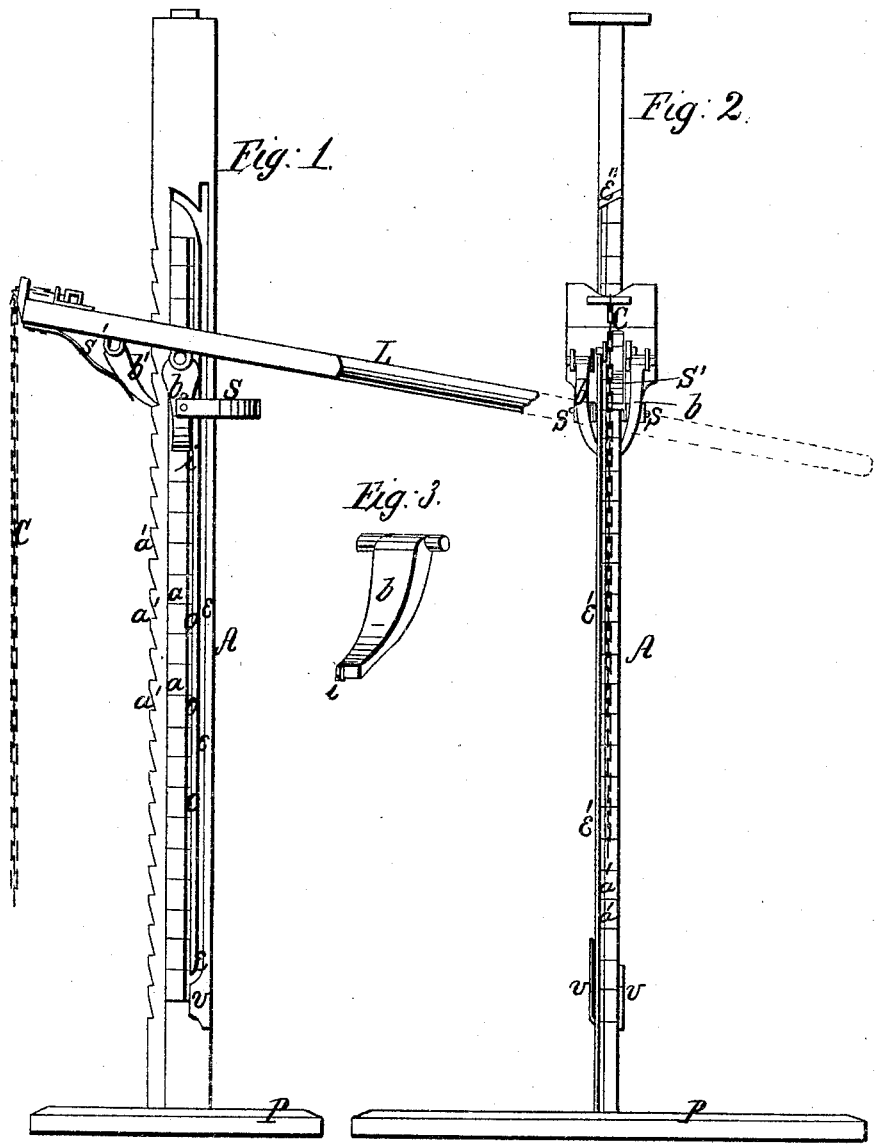

WILLIAM GREEN, OF HOLLY, MICHIGAN.

IMPROVEMENT IN LIFTING-JACK.

Specification forming part of Letters Patent No. 69,400, dated October 1, 1867.

*To all whom it may concern:*

Be it known that I, WILLIAM GREEN, of the city of Holly, in the county of Oakland and State of Michigan, have invented a new and Improved Lifting-Jack; and I do hereby declare the following to be a full, clear, and exact description of the same, reference being had to the accompanying drawings, forming part of this specification, and in which—

Figure 1 is a side elevation of my invention. Fig. 2 is a front elevation of the same, and Fig. 3 is a perspective view of the dog $b'$.

Similar letters of reference indicate corresponding parts in the several figures.

This invention is a neat, cheap, and convenient lifting-jack, designed for the special purpose of removing hop-poles from the ground.

In the drawings, A represents an upright post resting on a platform or pedestal, P, and provided on three sides with a series of steps or ratchet-teeth, $a a'$, extending nearly from its bottom to its top. L is a lever shifting up and down on the post A, which passes through a slot in it. One end of the lever is fashioned into a handle, and the other is provided with a chain or cord, C, designed to be tied around the hop-pole that is to be lifted out of the ground. The lever pivots on a shifting fulcrum consisting of the dogs $b b$, which operate both together in the side notches, $a a$, of the post A, and the dog $b'$, which operates alone in the front series of notches $a'$. These dogs hang from the under side of the lever, one on each side and one in front of the post A, against which they are closely pressed by springs $s s'$.

When the handle of the lever is being depressed, the lever is pivoted on the side dogs, $b b$, and the front dog, $b'$, rises and catches in a higher tooth or notch of the series $a'$.

When the motion is reversed and the handle elevated, the lever pivots on the front dog, $a'$, and the side dogs, $b b$, rise and catch in higher notches in the series $a a$. Thus the lever, while in operation, keeps constantly climbing the post A, until at length the dogs reach the highest notches of the series, before which time, however, the hop-pole will have been lifted from the ground.

It is now required to shift the lever back again to the bottom of the post. This is readily done by the operation of the guide-grooves $e e$ on the sides of the post, extending from the top of the series $a a$ down alongside of them to their bottom, and the flange or lip $e'$, extending in a similar manner from the top to the bottom of the series $a'$.

Each of the dogs is provided with a small tooth, $i$, which runs in a little groove, $o$, in the sides of the ratchet-teeth $a a'$, while the lever is climbing the post A, and which, when the lever is lifted slightly above the upper ratchet-teeth, catch in the grooves $e e$ and a groove, $e''$, above the lip $e'$, and, held in those grooves by the force of the springs $s s'$, cause the dogs to follow the side grooves, $e e$, and the lip $e'$ to the bottom of the post without coming in contact with the teeth $a a'$.

When the dogs reach the bottom of the series of steps or ratchet-teeth, they are thrown out of the grooves $e e$ and off of the lip $e'$ by guides $v v$, and caused to resume their position in connection with the teeth $a a'$, as before, and the apparatus is again ready for operation.

It is evident that while this apparatus is, by its lightness and ready adjustment, particularly adapted to the pulling up of hop-poles and other supporting-poles used in gardening or agricultural operations, it may be constructed of such materials and in such proportions as to be adapted to heavier labor, and be serviceable where lifting-jacks of greater power are required.

Having thus described my invention, what I claim as new, and desire to secure by Letters Patent, is—

1. The combination of the lever L, upright post A, grooves $e e$, lip $e'$, and guides $v v$, with the dogs $b b'$, each having the short projecting tooth $i$, and arranged and operating substantially as and for the purpose described.

2. The lifting-jack above described, consisting of the post A, having the series of teeth $a a'$, the grooves $e e$, lip $e'$, and guides $v v$, in combination with the lever L, having the dogs $b b'$, held in place by the springs $s s'$, and provided with the teeth $i i$, all the parts being constructed, arranged, and combined substantially in the manner and for the purpose specified.

To the above specification of my invention I have signed my hand this 10th day of August, 1867.

WILLIAM GREEN.

Witnesses:
 SOLON C. KEMON,
 CHAS. A. PETTIT.